US012142237B2

(12) United States Patent
Li

(10) Patent No.: US 12,142,237 B2
(45) Date of Patent: Nov. 12, 2024

(54) TIMING CONTROL DRIVING BOARD, DISPLAY PANEL, AND DISPLAY DEVICE

(71) Applicant: Shenzhen China Star Optoelectronics Semiconductor Display Technology Co., Ltd., Guangdong (CN)

(72) Inventor: Xinji Li, Guangdong (IL)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 267 days.

(21) Appl. No.: 17/270,876

(22) PCT Filed: Dec. 22, 2020

(86) PCT No.: PCT/CN2020/138346
§ 371 (c)(1),
(2) Date: Aug. 2, 2023

(87) PCT Pub. No.: WO2022/116309
PCT Pub. Date: Jun. 9, 2022

(65) Prior Publication Data

US 2023/0386423 A1 Nov. 30, 2023

(30) Foreign Application Priority Data

Dec. 1, 2020 (CN) ......................... 202011386638.5

(51) Int. Cl.
*G09G 3/36* (2006.01)

(52) U.S. Cl.
CPC ....... *G09G 3/3611* (2013.01); *G09G 2310/08* (2013.01); *G09G 2330/021* (2013.01); *G09G 2330/04* (2013.01)

(58) Field of Classification Search
CPC ............. G09G 3/3611; G09G 2310/08; G09G 2330/021; G09G 2330/04
See application file for complete search history.

(56) References Cited

U.S. PATENT DOCUMENTS 5,929,847 A * 7/1999 Yanagi .................. H04N 3/127 348/E3.015
6,972,940 B2 12/2005 Tsukasaki
(Continued)

FOREIGN PATENT DOCUMENTS

CN 202978233 6/2013
CN 203434856 2/2014
(Continued)

OTHER PUBLICATIONS

Translation of WO2019221333A1 (Year: 2019).*

*Primary Examiner* — Lixi C Simpson

(57) ABSTRACT

The present disclosure provides a timing control driving board, a display panel, and display device. The timing control driving board includes a power supply circuit, a power supply management circuit, an overvoltage protection circuit, and a transient voltage suppressor; a second end of the power supply circuit is connected to a first end of the overvoltage protection circuit; a second end of the overvoltage protection circuit is connected to a second end of the transient voltage suppressor and a second end of the power supply management circuit; and the overvoltage protection circuit is disconnected when an input voltage is higher than a first preset voltage.

14 Claims, 2 Drawing Sheets

(56) References Cited

U.S. PATENT DOCUMENTS

| | | | | |
|---|---|---|---|---|
| 2003/0218843 | A1 | 11/2003 | Tsukasaki et al. | |
| 2012/0187934 | A1* | 7/2012 | Suzuki | H02M 3/156 323/311 |
| 2014/0268443 | A1* | 9/2014 | Nassar | H02H 3/202 361/57 |
| 2018/0019603 | A1* | 1/2018 | Chen | H02H 1/0007 |
| 2019/0036495 | A1* | 1/2019 | Ng | H03F 3/195 |

FOREIGN PATENT DOCUMENTS

| | | | |
|---|---|---|---|
| CN | 104795798 | 7/2015 | |
| CN | 108155622 | 6/2018 | |
| CN | 109038481 | 12/2018 | |
| CN | 208622409 | 3/2019 | |
| CN | 110112703 | 8/2019 | |
| CN | 110890052 | 3/2020 | |
| CN | 111064172 | 4/2020 | |
| JP | 2003-308123 | 10/2003 | |
| KR | 10-2012-0039497 | 4/2012 | |
| WO | WO-2019221333 A1 * | 11/2019 | H01H 85/04 |

* cited by examiner

TIMING CONTROL DRIVING BOARD, DISPLAY PANEL, AND DISPLAY DEVICE

RELATED APPLICATIONS

This application is a National Phase of PCT Patent Application No. PCT/CN2020/138346 having International filing date of Dec. 22, 2020, which claims the benefit of priority of Chinese Patent Application No. 202011386638.5 filed on Dec. 1, 2020. The contents of the above applications are all incorporated by reference as if fully set forth herein in their entirety.

FIELD AND BACKGROUND OF THE INVENTION

The present disclosure relates to the field of display technology and, more particularly, to a timing control driving board, a display panel, and a display device.

Currently, liquid crystal display devices have been widely used in various electronic products as display components of electronic devices. A timing control (TCON) driving board is a key component of a liquid crystal display for displaying video image signals, which is commonly referred to as a logic board, a central control board, a decompression board, or a decoding board. The function of the timing control driving board is to process low voltage differential signaling (LVDS) image data input signals from a digital board through the timing control driving board, convert the LVDS image data input signals into LVDS signals capable of driving the liquid crystal display, and then directly send the LVDS signals to a LVDS receiving chip of the liquid crystal display. By processing a shift register to store the image data signals, clock signals are converted into control signals that can be recognized by the display, and row and column signals (reduced swing differential signaling) RSDS control operation of thin film transistors in the display to control degrees of twisting of liquid crystal molecules. The liquid crystal display is driven to display image.

A display power adapter directly provides a total power supply to the timing control driving board. The timing control driving board is currently designed as a 12 v input and uses a transient voltage suppressor (TVS) of 13 v to prevent electrical over stress (EOS). However, there are two types of display universal adapters, 12V and 19V, and there is a risk of using a wrong adapter. For example, using the wrong adapter causes damage to the transient voltage suppressor, causes a power supply short circuit to generate a high current, and causes damage to the power supply, thereby causing a black screen of the display panel and damaging the display panel.

That is, in the prior art, when a power adapter mismatch occurs to the display panel, the display panel is damaged.

SUMMARY OF THE INVENTION

An embodiment of the present disclosure provides a timing control driving board, and aims to solve the problem in the prior art that the display panel is damaged when the power adapter mismatch occurs to the display panel.

To solve the above problem, according to a first aspect, the present disclosure provides a timing control driving board applied to a display panel, the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage.

Wherein the timing control driving board further comprises a first fuse, wherein a first end of the first fuse is connected to a second end of the power supply circuit, and a second end of the first fuse is connected to a first end of the overvoltage protection circuit.

Wherein the timing control driving board further comprises a second fuse connected in series with the first fuse, a first end of the second fuse is connected to the second end of the first fuse, and a second end of the second fuse is connected to the first end of the overvoltage protection circuit.

Wherein the timing control driving board further comprises an under-voltage protection circuit connected in series with the first fuse, and both ends of the under-voltage protection circuit is connected to the second end of the first fuse and the first end of the second fuse, respectively, wherein the under-voltage protection circuit is disconnected when the input voltage is lower than a second preset voltage to disconnect the first fuse and the second fuse.

Wherein the timing control driving board further comprises a first capacitor, a first end of the first capacitor is connected to the first end of the overvoltage protection circuit, and a second end of the first capacitor is connected to the first end of the transient voltage suppressor and the first end of the power supply management circuit, respectively.

Wherein the timing control driving board further comprises a second capacitor, a first end of the second capacitor is connected to the first end of the overvoltage protection circuit, and a second end of the second capacitor is connected to the first end of the transient voltage suppressor and the first end of the power supply management circuit, respectively.

Wherein the overvoltage protection circuit is a protection relay.

Wherein the first end of the power supply circuit is grounded.

To solve the above problem, in a second aspect, the present disclosure provides a display panel comprising a timing control driving board, wherein the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage.

Wherein the timing control driving board further comprises a first fuse, wherein a first end of the first fuse is connected to a second end of the power supply circuit, and a second end of the first fuse is connected to a first end of the overvoltage protection circuit.

Wherein the timing control driving board further comprises a second fuse connected in series with the first fuse, a first end of the second fuse is connected to the second end of the first fuse, and a second end of the second fuse is connected to the first end of the overvoltage protection circuit.

Wherein the timing control driving board further comprises an under-voltage protection circuit connected in series with the first fuse, and both ends of the under-voltage protection circuit is connected to the second end of the first fuse and the first end of the second fuse, respectively, wherein the under-voltage protection circuit is disconnected when the input voltage is lower than a second preset voltage to disconnect the first fuse and the second fuse.

Wherein the timing control driving board further comprises the timing control driving board further comprises a first capacitor, a first end of the first capacitor is connected to the first end of the overvoltage protection circuit, and a second end of the first capacitor is connected to the first end of the transient voltage suppressor and the first end of the power supply management circuit, respectively.

Wherein the timing control driving board further comprises a second capacitor, a first end of the second capacitor is connected to the first end of the overvoltage protection circuit, and a second end of the second capacitor is connected to the first end of the transient voltage suppressor and the first end of the power supply management circuit, respectively.

Wherein the overvoltage protection circuit is a protection relay.

Wherein the first end of the power supply circuit is grounded.

To solve the above problem, in a third aspect, the present disclosure provides a display device comprising a display panel, the display panel comprises a timing control driving board, wherein the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage.

Wherein the timing control driving board further comprises a first fuse, wherein a first end of the first fuse is connected to a second end of the power supply circuit, and a second end of the first fuse is connected to a first end of the overvoltage protection circuit.

Wherein the timing control driving board further comprises a second fuse connected in series with the first fuse, a first end of the second fuse is connected to the second end of the first fuse, and a second end of the second fuse is connected to the first end of the overvoltage protection circuit.

Wherein the timing control driving board further comprises an under-voltage protection circuit connected in series with the first fuse, and both ends of the under-voltage protection circuit is connected to the second end of the first fuse and the first end of the second fuse, respectively, wherein the under-voltage protection circuit is disconnected when the input voltage is lower than a second preset voltage to disconnect the first fuse and the second fuse.

Beneficial effect of the present disclosure is that, unlike the prior art, the present disclosure provides a timing control driving board applied to a display panel. The timing control driving board comprises a power supply circuit, a power supply management circuit, an overvoltage protection circuit, and a transient voltage suppressor, wherein the power supply circuit is configured to connect an external power adapter and supplying an input voltage to the power supply management circuit, and the power supply management circuit is configured to convert the input voltage into various voltages required for operation of the display panel. A first end of the power supply circuit is connected to a first end of the transient voltage suppressor and a first end of the power supply management circuit, a second end of the power supply circuit is connected to a first end of the overvoltage protection circuit, a second end of the overvoltage protection circuit is connected to a second end of the transient voltage suppressor and a second end of the power supply management circuit, and the overvoltage protection circuit is disconnected when the input voltage is higher than a first preset voltage, wherein the power supply management circuit works normally when the input voltage is lower than the first preset voltage. In the present disclosure, when the input voltage provided by the power supply circuit is higher than a working voltage of the power supply management circuit due to mismatch of the external power supply adapter, the power supply circuit is disconnected from the power supply management circuit and the transient voltage suppressor through the overvoltage protection circuit, so that the input voltage of the mismatch of the external power supply adapter can be prevented from damaging the power supply management circuit and the transient voltage suppressor, and the display panel can be prevented from being damaged when the mismatch of the power supply adapter occurs.

BRIEF DESCRIPTION OF THE SEVERAL VIEWS OF THE DRAWINGS

In order to more clearly explain technical solutions in embodiments of the present disclosure, the following will briefly introduce drawings required in the description of the embodiments. Obviously, the drawings in the following description are only some embodiments of the present disclosure. For those skilled in the art, without paying any creative work, other drawings can be obtained based on these drawings.

DESCRIPTION OF SPECIFIC EMBODIMENTS OF THE INVENTION

Figure 1:
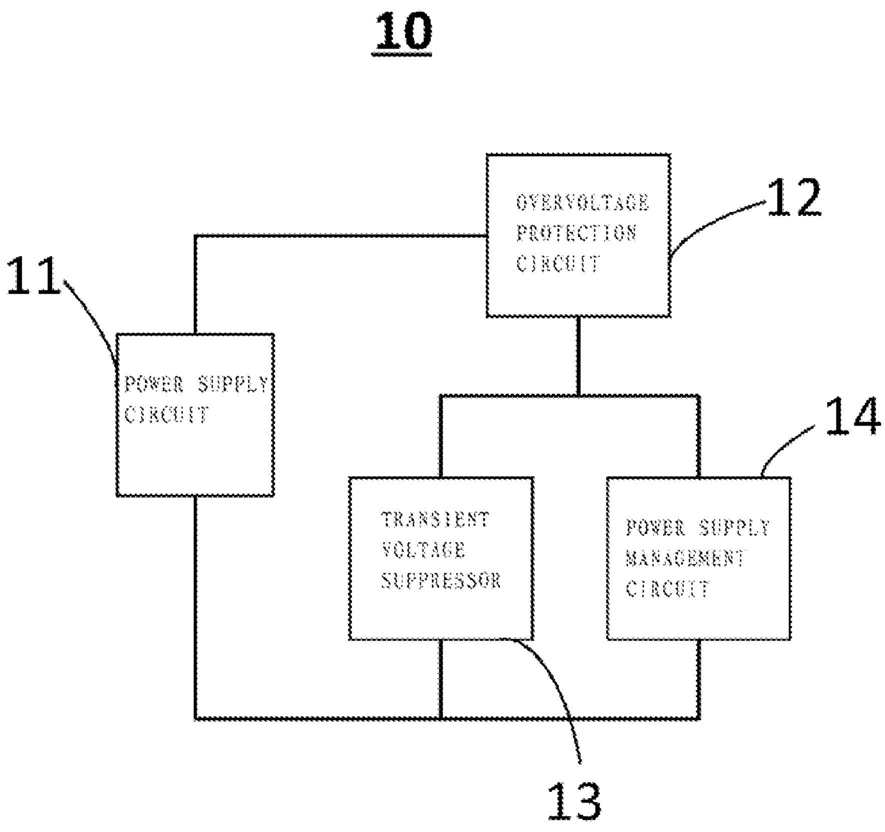
FIG. 1 is a schematic structural diagram of a timing control driving board according to an embodiment of the present disclosure.

Technical solutions in embodiments of the present disclosure will be clearly and completely described below in conjunction with drawings in the embodiments of the present disclosure. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the present disclosure, the word "exemplary" is used to mean "serving as an example, illustration, or explanation". Any embodiment described as "exemplary" in the present disclosure is not necessarily construed as being more preferable or advantageous than other embodiments. In order to enable any person skilled in the art to implement and use the present disclosure, the following description is given. In the following description, the details are listed for the purpose of explanation. It should be understood that those of ordinary skill in the art can realize that the present disclosure can also be implemented without using these specific details. In other instances, well-known structures and processes will not be elaborated to avoid unnecessary details to obscure the description of the present disclosure. Therefore, the present disclosure is not intended to be limited to the illustrated embodiments, but is consistent with the widest scope that conforms to the principles and features disclosed in the present disclosure.

An embodiment of the present disclosure provides a timing control driving board applied to a display panel. The timing control driving board comprises a power supply circuit, a power supply management circuit, an overvoltage protection circuit, and a transient voltage suppressor, wherein the power supply circuit is configured to connect an external power adapter and supplying an input voltage to the power supply management circuit, and the power supply management circuit is configured to convert the input voltage into various voltages required for operation of the display panel. A first end of the power supply circuit is connected to a first end of the transient voltage suppressor and a first end of the power supply management circuit, a second end of the power supply circuit is connected to a first end of the overvoltage protection circuit, a second end of the overvoltage protection circuit is connected to a second end of the transient voltage suppressor and a second end of the power supply management circuit, and the overvoltage protection circuit is disconnected when the input voltage is higher than a first preset voltage, wherein the power supply management circuit works normally when the input voltage is lower than the first preset voltage. In the present disclosure, when the input voltage provided by the power supply circuit is higher than a working voltage of the power supply management circuit due to mismatch of the external power supply adapter, the power supply circuit is disconnected from the power supply management circuit and the transient voltage suppressor through the overvoltage protection circuit, so the input voltage of the mismatch of external power supply adapters can be prevented from damaging the power supply management circuit and the transient voltage suppressor, and the display panel can be prevented from being damaged when the mismatch of the power supply adapter occurs. The timing control driving board of the embodiment of the present disclosure can be applied to various display panels. Detailed description is given below.

Referring to FIG. 1, FIG. 1 is a schematic structural diagram of a timing control driving board according to an embodiment of the present disclosure.

As shown in FIG. 1, in the embodiment of the present disclosure, the timing control driving board 10 is applied to a display panel, and comprises a power supply circuit 11, a power supply management circuit 14, an overvoltage protection circuit 12, and a transient voltage suppressor 13.

The power supply circuit 11 is configured to connect an external power adapter and supply an input voltage to the power supply management circuit 14. The power supply management circuit 14 is configured to convert the input voltage into various voltages required for operation of the display panel. A first end of the power supply circuit 11 is connected to a first end of the transient voltage suppressor 13 and a first end of the power supply management circuit 14, a second end of the power supply circuit 11 is connected to a first end of the overvoltage protection circuit 12, and a second end of the overvoltage protection circuit 12 is connected to a second end of the transient voltage suppressor 13 and a second end of the power supply management circuit 14. The overvoltage protection circuit 12 is disconnected when the input voltage is higher than a first preset voltage, wherein the power supply management circuit 14 operates normally when the voltage is lower than the first preset voltage. Further, the overvoltage protection circuit 12 is turned on when the input voltage is lower than the first preset voltage.

The transient voltage suppressor 13 generally operates in a reverse off state in the circuit, at which time it does not affect any function of the circuit. In a predetermined reverse application condition, when a large transient disturbance voltage or pulse current is generated in the circuit due to lightning and various electrical interference, the transient voltage suppressor rapidly switches into a reverse conduction state in a very short time and clamps the voltage of the circuit to a desired safety value, thereby effectively protecting the precise components in the electronic circuit from damage. After the interference pulse has passed, the transient voltage suppressor 13 is switched into the reverse off state again. Since the clamping voltage is lower than the maximum withstand voltage of the other devices in the circuit at the time of reverse conduction, protection of the other components is achieved.

The power supply management circuit 14 is a power supply management chip. Power supply management integrated circuit (PMIC) is a chip that performs functions of converting, distributing, detecting, and managing electric power in a display panel. It is mainly responsible for identifying power supply amplitude of the central processing unit (CPU), generating a corresponding short moment wave, and driving the subsequent stage circuit to output power. Conventional power supply management chips comprise HIP6301, IS6537, RT9237, ADP3168, KA7500, and TL494. The power supply management circuit 14 converts the input voltage into a voltage required for operation of the display panel, for example, VGH, VGL, VgoffL, VgoffH, and VCOM.

VGH refers to a high potential of the gate, i.e., a voltage at which the gate is opened. VGL is a low potential of the gate, i.e., a voltage at which the gate is turned off. VCOM is a liquid crystal deflection reference voltage, and on the PCB, the VDDA is divided into 10-14 sets of voltages by a voltage-dividing loop and used as reference voltages of the output VGMA of the internal DAC of the power supply management chip. A plurality of sets of reference voltages are generated by a voltage-dividing circuit of the PCB, so that the voltage-dividing circuit in the power supply management chip can be reduced.

In a specific embodiment, the first preset voltage is 13.2V, that is, the overvoltage protection circuit 12 turns on the overvoltage protection when the input voltage reaches 13.2V. The maximum reverse operating voltage of the transient voltage suppressor 13 is 13.2V, and the maximum reverse operating voltage is the maximum reverse voltage that is allowed to be applied when the diode is operating, which is typically half of the breakdown voltage. When the value is exceeded, the diode may be damaged due to reverse breakdown. The external power adapter may be a 12V or 19V power adapter. The normal operating voltage of the power supply management circuit 14 is 12V. When the external power adapter is a power adapter of 12V, the power supply circuit 11 supplies an input voltage of 12V to the power supply management circuit 14, and the power supply management circuit 14 operates normally. When the external power adapter is a power adapter of 19V, the power supply circuit 11 supplies an input voltage of 19V to the power supply management circuit 14, and the power supply management circuit 14 is overloaded.

In a specific embodiment, the overvoltage protection circuit 12 is a protection relay. The protection relay is an electric control device that causes a predetermined step change in the controlled amount in the electric output circuit when the change in input amount reaches a predetermined requirement. It has an interactive relationship between the control system and the controlled system. Generally used in automated control circuits, it is in fact an "automatic switch" that controls operation of large currents with small currents. Therefore, it plays a role of automatic regulation, safety protection, conversion circuit and the like in the circuit. For example, take a common thermal relay of protection relay as an example, when the input voltage exceeds 13.2V, the power supply management circuit 14 is overloaded, and the large current in the protection relay causes overheating of the relay itself, causing it to deform and disconnect from the contact, so that the circuit is cut off to prevent the fault from expanding. When the relay is cooled for a period of time, the deformation of the relay itself is gradually reset, and the protection relay is turned on. Therefore, even if the display is temporarily unusable when the adapter is mismatched, the display may continue to be used after the adapter is removed without damaging the power supply circuit 11 and the display panel.

When the external power adapter is 12V, the power adapter adapts properly, the input voltage does not exceed the first preset voltage, and the overvoltage protection circuit 12 is not operated. The voltage across the transient voltage suppressor 13 does not exceed the maximum reverse operating voltage. Therefore, the transient voltage suppressor 13 is in the reverse off state. At this time, the power supply management circuit 14 operates normally, and the entire protection circuit does not function, thereby causing no interference to the power supply management circuit 14.

When the external power adapter is 19V, the power adapter adapts incorrectly, the input voltage does not exceed the first preset voltage, and the overvoltage protection circuit 12 is turned off. The transient voltage suppressor is still in the reverse off state and does not damage the transient voltage suppressor, and the power supply circuit 11 is not short-circuited, so the display panel power supply circuit 11 and the transient voltage suppressor 13 are prevented from being damaged and the display panel is prevented from being damaged.

When the input voltage instantaneously rises to a large value in the power supply circuit 11 in the event of an electro-static discharge (ESD), leakage, lightning, and various electrical disturbances, the transient voltage suppressor 13 rapidly switches into a reverse conduction state in a very short time and clamps the voltage of the circuit to a desired safety value. After the input voltage is released, the transient voltage suppressor 13 is switched into the reverse off state to continue to ensure that the power supply management circuit 14 operates properly.

Figure 2:
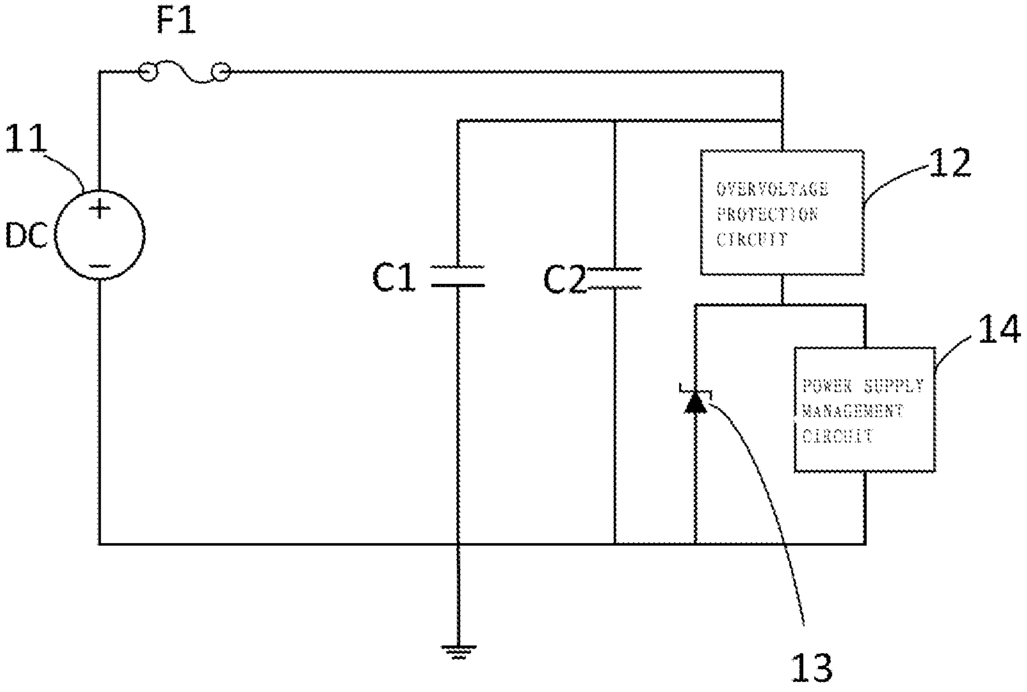
FIG. 2 is a schematic structural diagram of a timing control driving board according to another embodiment of the present disclosure.

Further, referring to FIG. 2, FIG. 2 is a schematic structural diagram of a timing control driving board according to another embodiment of the present disclosure.

In this embodiment of the present disclosure, the timing control driving board 10 further comprises a first fuse F1. A first end of the first fuse F1 is connected to the second end of the power supply circuit 11, and a second end of the first fuse F1 is connected to the first end of the overvoltage protection circuit 12. The fuse is also referred to as a current fuse, which is defined by the IEC127 standard as a fuse body. It is mainly used for overload protection. When a fuse is properly arranged in the circuit, the fuse itself fuses and cuts off the current when the current is abnormally raised to a certain height and heat, thereby ensuring the safe operation of the circuit. The first fuse F1 may be disconnected while the power supply management circuit 14 is operating at high voltage for a certain period of time to protect the power supply management circuit 14.

In this embodiment of the present disclosure, the timing control driving board 10 further comprises a first capacitor C1. A first end of the first capacitor C1 is connected to the first end of the overvoltage protection circuit 12, and a second end of the first capacitor C1 is connected to the first end of the transient voltage suppressor 13 and the first end of the power supply management circuit 14. A voltage stabilizing filtering function can be performed by parallel connection of the first capacitors C1.

In this embodiment of the present disclosure, the timing control driving board 10 further comprises a second capacitor C2. A first end of the second capacitor C2 is connected to the first end of the overvoltage protection circuit 12, and the second end of the second capacitor C2 is connected to the first end of the transient voltage suppressor 13 and the first end of the power supply management circuit 14. By parallel connection of the first capacitor C1 and the second capacitor C2, it is possible to further function as a voltage stabilizing filter. In other embodiments, three, four, five or more capacitors may be connected in parallel, which is not limited by the present disclosure.

In the embodiment of the present disclosure, the first end of the power supply circuit 11 is grounded.

Figure 3:
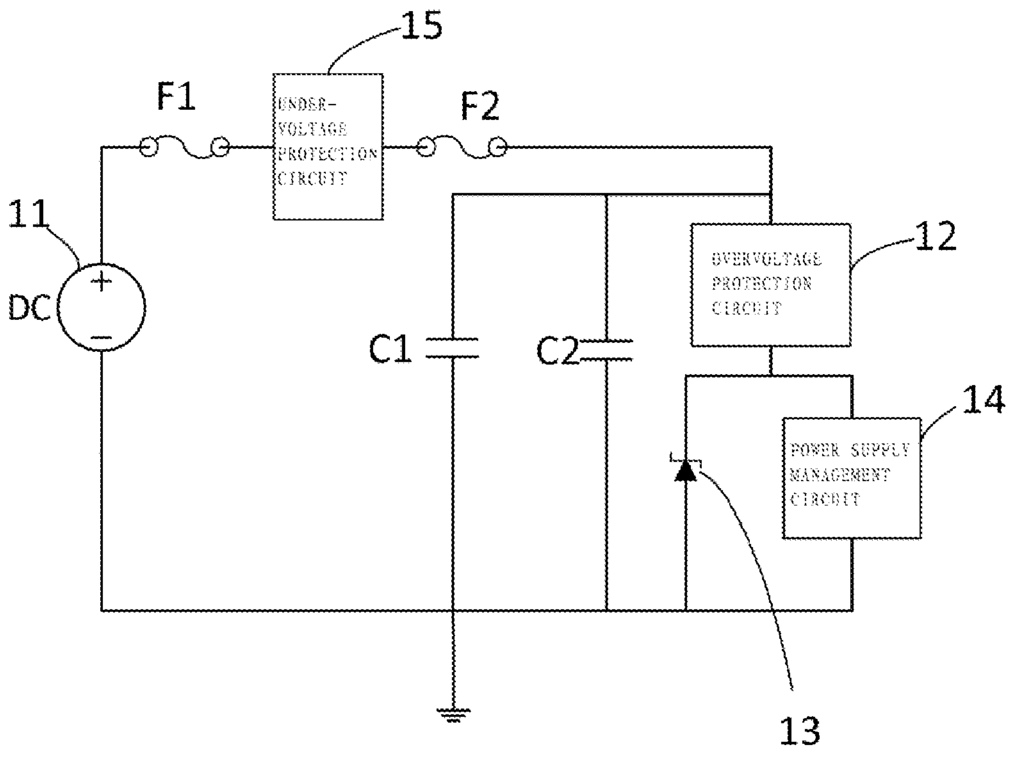
FIG. 3 is a schematic structural diagram a timing control driving board according to yet another embodiment of the present disclosure.

Further, referring to FIG. 3, FIG. 3 is a schematic structural diagram of a timing control driving board according to yet another embodiment of the present disclosure.

In this embodiment of the present disclosure, the timing control driving board 10 further comprises a second fuse F2 connected in series with the first fuse F1. A first end of the second fuse F2 is connected to the second end of the first fuse F1, and a second end of the second fuse F2 is connected to the first end of the overvoltage protection circuit 12. By providing two fuses in series, damage to the power supply management circuit 14 caused by the failure of a single fuse to fuse in time can be avoided, thereby improving circuit stability. In other embodiments, three, four, five, or more fuses may be connected in series, and the present disclosure is not limited thereto.

In the embodiment of the present disclosure, the timing control driving board 10 further comprises an under-voltage protection circuit 15 connected in series with the first fuse F1. Both ends of the under-voltage protection circuit 15 are connected to the second end of the first fuse F1 and the first end of the second fuse F2, respectively. The under-voltage protection circuit 15 is disconnected when the input voltage is lower than the second preset voltage to disconnect the first fuse F1 and the second fuse F2. Wherein, the second preset voltage may be 10V-11V. The under-voltage protection circuit 15 may be a loss-of-voltage trip circuit breaker. The loss-of-voltage trip circuit breaker itself comprises a loss-of-voltage trip device. The coil of the loss-of-voltage trip circuit breaker is connected to the phase-to-phase voltage via a button and a linkage contact. When the input voltage is reduced to a predetermined value, the suction force of the electromagnet of the loss-of-voltage trip circuit breaker is reduced, so that the lever rotates to act on the trip mechanism to detach the circuit breaker.

Further, the present disclosure further provides a display panel comprising a timing control driving board according to any one of the above.

Further, the present disclosure further provides a display device including a display panel according to any one of the above.

Beneficial effect of the present disclosure is that, unlike the prior art, the present disclosure provides a timing control driving board applied to a display panel. The timing control driving board comprises a power supply circuit, a power supply management circuit, an overvoltage protection circuit, and a transient voltage suppressor, wherein the power supply circuit is configured to connect an external power adapter and supplying an input voltage to the power supply management circuit, and the power supply management circuit is configured to convert the input voltage into various voltages required for operation of the display panel. A first end of the power supply circuit is connected to a first end of the transient voltage suppressor and a first end of the power supply management circuit, a second end of the power supply circuit is connected to a first end of the overvoltage protection circuit, a second end of the overvoltage protection circuit is connected to a second end of the transient voltage suppressor and a second end of the power supply management circuit, and the overvoltage protection circuit is disconnected when the input voltage is higher than a first preset voltage, wherein the power supply management circuit works normally when the input voltage is lower than the first preset voltage. In the present disclosure, when the input voltage provided by the power supply circuit is higher than a working voltage of the power supply management circuit due to mismatch of external power supply adapters, the power supply circuit is disconnected from the power supply management circuit and the transient voltage suppressor through the overvoltage protection circuit, so the input voltage of the mismatch of the external power supply adapters can be prevented from damaging the power supply management circuit and the transient voltage suppressor, and the display panel can be prevented from being damaged when the mismatch of the power supply adapters occurs.

It should be noted that only the above-described structures have been described in the above-described display panel embodiments, and it should be understood that, in addition to the above-described structures, any other necessary structure may be included in the display panel of the embodiment of the present disclosure, which is not specifically limited herein.

In the specific implementation, each of the above units or structures may be implemented as an independent entity, or may be implemented in any combination as the same entity or several entities. For a specific implementation of each of the above units or structures, reference may be made to the foregoing method embodiments, and details are not described herein.

The foregoing describes in detail a timing control driving board, a display panel, and a display device according to an embodiment of the present disclosure, and the principles and embodiments of the present disclosure are described herein using specific examples. The foregoing description of the embodiments is merely intended to assist in understanding the method of the present disclosure and the core concepts thereof. At the same time, variations in the specific embodiments and scope of application will occur to those skilled in the art in accordance with the teachings of the present disclosure, and in light of the foregoing description, the present disclosure is not to be construed as limiting the present disclosure.

What is claimed is:

1. A timing control driving board applied to a display panel, the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage;

wherein the timing control driving board further comprises a first fuse, wherein a first end of the first fuse is connected to the second end of the power supply circuit, and a second end of the first fuse is connected to the first end of the overvoltage protection circuit; and wherein the timing control driving board further comprises a second fuse connected in series with the first fuse, a first end of the second fuse is connected to the second end of the first fuse, and a second end of the second fuse is connected to the first end of the overvoltage protection circuit.

2. The timing control driving board according to claim 1, wherein the timing control driving board further comprises an under-voltage protection circuit connected in series with the first fuse, and two ends of the under-voltage protection circuit are connected to the second end of the first fuse and the first end of the second fuse, respectively, wherein the under-voltage protection circuit is disconnected when the input voltage is lower than a second preset voltage to disconnect the first fuse and the second fuse.

3. The timing control driving board according to claim 1, wherein the timing control driving board further comprises a first capacitor, a first end of the first capacitor is connected to the first end of the overvoltage protection circuit, and a second end of the first capacitor is connected to the first end of the transient voltage suppressor and the first end of the power supply management circuit, respectively.

4. The timing control driving board according to claim 3, wherein the timing control driving board further comprises a second capacitor, a first end of the second capacitor is connected to the first end of the overvoltage protection circuit, and a second end of the second capacitor is connected to the first end of the transient voltage suppressor and the first end of the power supply management circuit, respectively.

5. The timing control driving board according to claim 1, wherein the overvoltage protection circuit is a protection relay.

6. The timing control driving board according to claim 1, wherein the first end of the power supply circuit is grounded.

7. A display panel, wherein the display panel comprises a timing control driving board, the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage;

wherein the timing control driving board further comprises a first fuse, wherein a first end of the first fuse is connected to the second end of the power supply circuit, and a second end of the first fuse is connected to the first end of the overvoltage protection circuit; and wherein the timing control driving board further comprises a second fuse connected in series with the first fuse, a first end of the second fuse is connected to the second end of the first fuse, and a second end of the second fuse is connected to the first end of the overvoltage protection circuit.

8. The display panel according to claim 7, wherein the timing control driving board further comprises an under-voltage protection circuit connected in series with the first fuse, and two ends of the under-voltage protection circuit are connected to the second end of the first fuse and the first end of the second fuse, respectively, wherein the under-voltage protection circuit is disconnected when the input voltage is lower than a second preset voltage to disconnect the first fuse and the second fuse.

9. The display panel according to claim 7, wherein the timing control driving board further comprises a first capacitor, a first end of the first capacitor is connected to the first end of the overvoltage protection circuit, and a second end of the first capacitor is connected to the first end of the transient voltage suppressor and the first end of the power supply management circuit, respectively.

10. The display panel according to claim 9, wherein the timing control driving board further comprises a second capacitor, a first end of the second capacitor is connected to the first end of the overvoltage protection circuit, and a second end of the second capacitor is connected to the first end of the transient voltage suppressor and the first end of the power supply management circuit, respectively.

11. The display panel according to claim 7, wherein the overvoltage protection circuit is a protection relay.

12. The display panel according to claim 7, wherein the first end of the power supply circuit is grounded.

13. A display device, wherein the display device comprises a display panel comprising a timing control driving board, wherein the timing control driving board comprises a power supply circuit, a power supply management circuit, an overvoltage protection circuit, and a transient voltage suppressor, wherein the power supply circuit is configured to connect an external power adapter and supply an input voltage to the power supply management circuit, and the power supply management circuit is configured to convert the input voltage into various voltages required for operation of the display panel;

a first end of the power supply circuit is connected to a first end of the transient voltage suppressor and a first end of the power supply management circuit, a second end of the power supply circuit is connected to a first end of the overvoltage protection circuit, and a second end of the overvoltage protection circuit is connected to a second end of the transient voltage suppressor and a second end of the power supply management circuit, wherein the overvoltage protection circuit is disconnected when the input voltage is higher than a first preset voltage, and the power supply management circuit works normally when the input voltage is lower than the first preset voltage;

wherein the timing control driving board further comprises a first fuse, wherein a first end of the first fuse is connected to the second end of the power supply circuit, and a second end of the first fuse is connected to the first end of the overvoltage protection circuit; and wherein the timing control driving board further comprises a second fuse connected in series with the first fuse, a first end of the second fuse is connected to the second end of the first fuse, and a second end of the second fuse is connected to the first end of the overvoltage protection circuit.

14. The display device according to claim 13, wherein the timing control driving board further comprises an under-voltage protection circuit connected in series with the first fuse, and two ends of the under-voltage protection circuit are connected to the second end of the first fuse and the first end of the second fuse, respectively, wherein the under-voltage protection circuit is disconnected when the input voltage is lower than a second preset voltage to disconnect the first fuse and the second fuse.

* * * * *